April 29, 1924.

J. V. MARTIN

AIRCRAFT CONTROL MECHANISM

Original Filed Sept. 16, 1918     7 Sheets-Sheet 1

1,492,304

Patented Apr. 29, 1924.

1,492,304

UNITED STATES PATENT OFFICE.

JAMES V. MARTIN, OF NEW YORK, N. Y.

AIRCRAFT-CONTROL MECHANISM.

Application filed September 16, 1918, Serial No. 254,233. Renewed January 9, 1923.

*To all whom it may concern:*

Be it known that I, JAMES V. MARTIN, a citizen of the United States of America, residing at New York, in the county of New York and State of New York, have invented certain new and useful Improvements in Aircraft-Control Mechanism, of which the following is a specification, reference being had therein to the accompanying drawings.

This invention relates to aeroplane construction and controlling mechanism and its objects are to provide a construction whereby head resistance is reduced to a minimum, a very light yet strong and rigid construction secured; to provide a light, simple and compact control mechanism which may be located within each aileron; and to provide in conjunction with automatic aerodynamic stabilizing means, means for manually operating the same whereby the aeroplane may be permitted to side slip under control of said automatic stabilizing means.

A further object of the invention is to provide certain new and useful features in the construction, arrangement and combination of parts, all as hereinafter more fully described.

With these and other ends in view the invention consists in the matters hereinafter more fully set forth and particularly pointed out in the appended claims, reference being had to the accompanying drawings in which—

Figure 14:
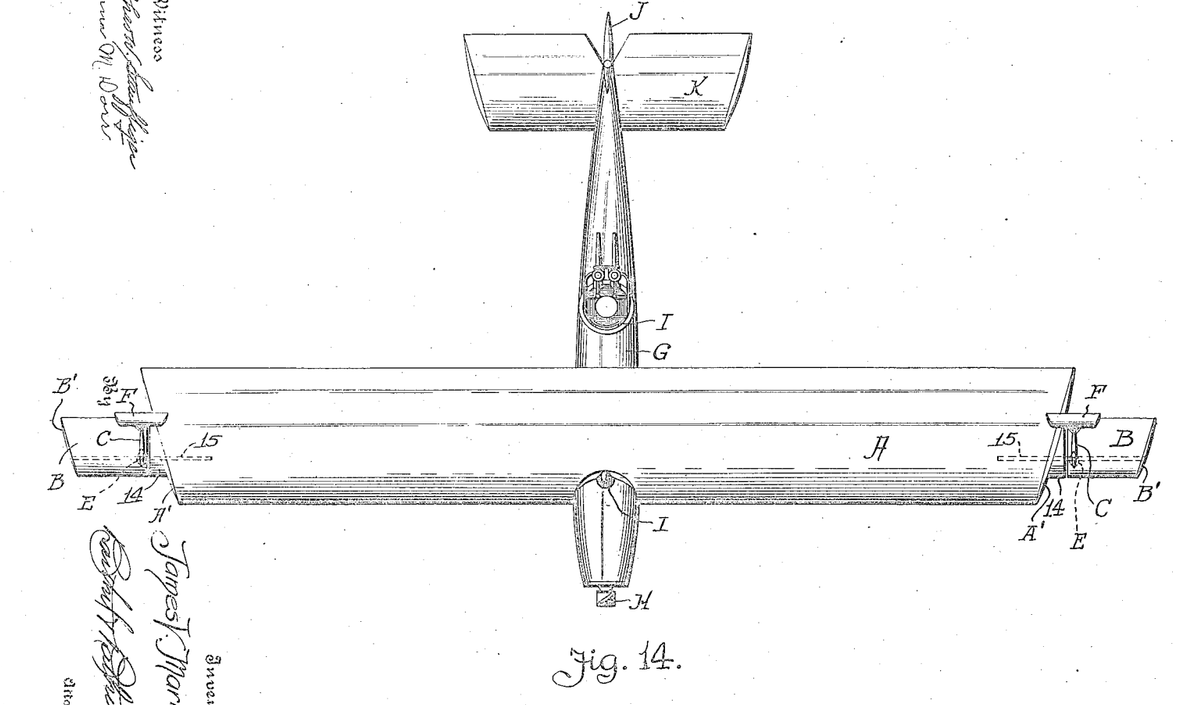
Fig. 14 is a plan view of the aeroplane.
Figure 15:
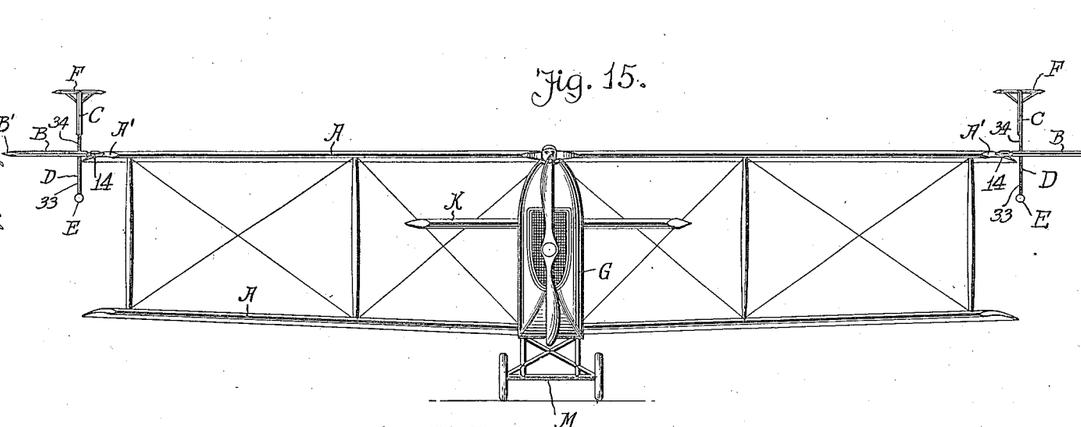
Fig. 15 is a front end elevation of the same.
Figure 16:
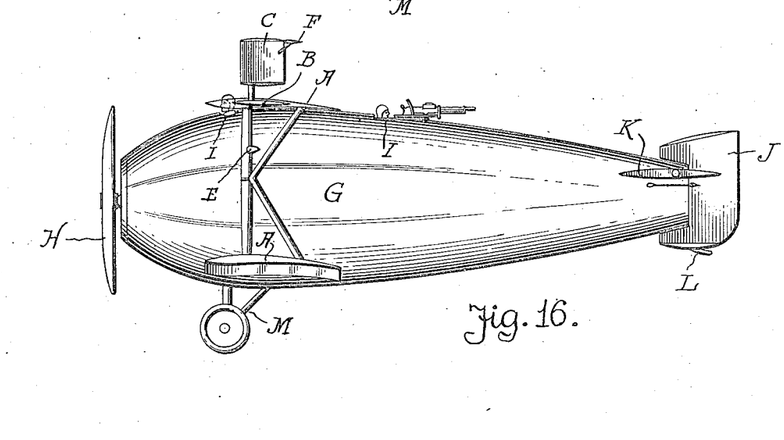
Fig. 16 is a side elevation.

Figs. 14, 15 and 16 are illustrative of an aeroplane construction embodying features of this invention but it will be understood that the several features of this invention may be embodied in other aeroplane types or constructions and that I do not therefore limit myself to the particular type or construction of the aeroplane shown.

In the drawings A indicates the wings or main sustaining planes of an aeroplane, B indicates suitable ailerons, one at each end of the main plane, C a suitable vertically disposed aerofoil mounted upon the upper end of a gravity member D provided with a weight E at its lower end and having mechanism shown in detail in Figs. 1 to 5, inclusive, for connecting the member D with its aileron to change the incidence thereof upon fore and aft or lateral swinging movement of said member relative to the fore and aft and lateral axes of the aeroplane; and F is a horizontally disposed aerofoil or fin rigidly attached to the vertical aerofoil rearwardly thereof and at its upper end to automatically swing the gravity member in a fore and aft direction and neutralize the incidence of the aileron to the line of flight; G is a fuselage or body located centrally of the wings and of a preferred form and construction for carrying the power plant (not shown) in its foremost part which drives directly the propeller H also located at the forward end of the body, said body being provided with cockpits I for the pilot and gunner. This novel arrangement of the operator's cockpit above and to rearward of the compartment for the aeroplane motor and forward of the upper wing of the biplane illustrated, provides unusual vision combined with ready accessibility of the motor adjacent the pilot, within the streamlined fuselage, and to secure warmth from the motor and radiator which is clearly shown immediately to rearward of the propeller H, in Figs. 14, 15 and 16. Attached to the rear end of the body is the rudder J and altitude planes K, the rudder being provided with a tail skid L and the body with a ground chassis indicated at M.

The outer ends of each wing are preferably formed so that the end edges A' converge forwardly at an angle of approximately 15° to the fore and aft axis of the aeroplane, and the outer end edges B' of the ailerons are also preferably formed at a corresponding angle, as are also the ends of the altitude planes K. The ends of each horizontal aerofoil F are further formed to converge forwardly at an angle of approximately 15° to the fore and aft axis of the aeroplane, the end edges A' of the wings, the outer end edges B' of the ailerons and of the aerofoils F being preferably stream lined fore and aft and given half round contour in cross section, as more clearly shown at O in Fig. 13.

By forming the wings and several aerofoils with ends which converge forwardly or at an angle to the fore and aft axis of the aeroplane, and by stream-lining these end edges fore and aft and giving them a rounded contour in cross section, the head resistance of the aeroplane is reduced to the minimum.

Figures 6, 12:
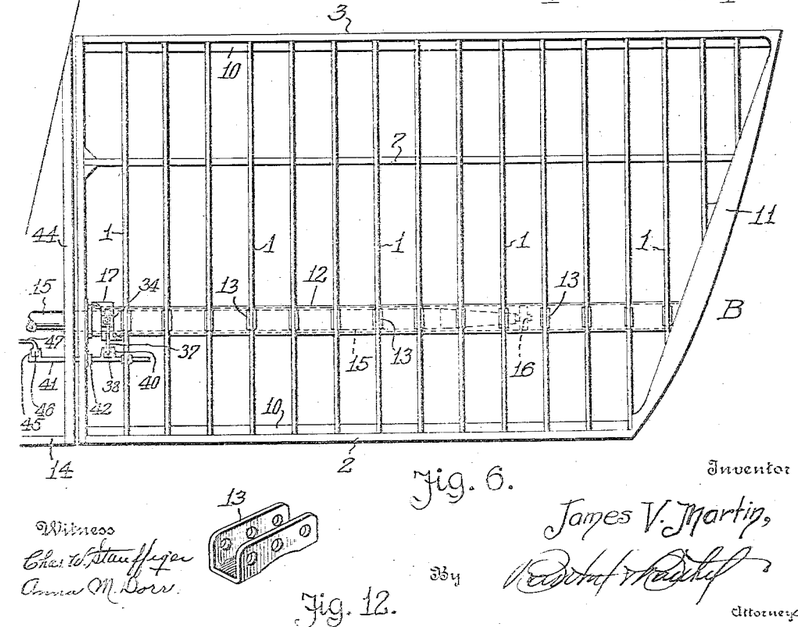
Fig. 6 is a plan view of the skeleton or framework of an aileron.
Fig. 12 is a perspective detail of a rib clip.
Figures 7, 8, 9, 10, 11, 13:
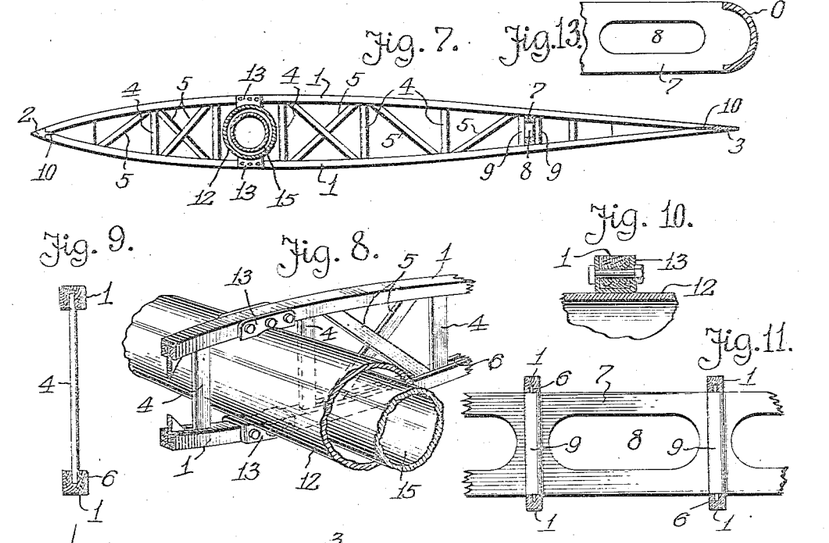
Fig. 7 is a transverse section through Fig. 6.
Fig. 8 is a perspective detail of a portion of an aileron.
Fig. 9 is a transverse section of one of the aileron ribs.
Fig. 10 is a sectional detail illustrating the manner of securing the ribs to a bearing tube or hollow spar.
Fig. 11 is a detail showing the construction of an intermediate aileron bar.
Fig. 13 is a sectional detail of a formed end member of an aileron.

Referring to Fig. 6 of the drawings, the skeleton or frame work of one of the ailerons B is shown in plan view in this figure. This frame work comprises a series of parallel spaced ribs 1 extending from the entering edge bar 2 to the trailing edge bar 3, said ribs being bent to give the desired contour to the outer surface or skin of the aerofoil, and the ribs of each pair are spaced apart by suitable struts 4 and diagonal bracing members 5, the ends of which struts and braces are set in longitudinal grooves 6 formed in the inner edges of the ribs 1. An intermediate bar 7 extends across between the ribs forwardly of the trailing edge bar and, for the purpose of lightness, is cut away or formed with openings 8 between the ribs 1, as shown in Fig. 11. To securely hold the bar 7 in position between the ribs, a suitable strut member 9 is placed at each side of the bar between the ribs, as shown in Figs. 7 and 11. The entering edge bar 2 and the trailing edge bar 3 are preferably formed in a suitable manner each with a tongue 10 extending from its inner edge, to which tongue the ends of the ribs may be conveniently secured as shown in Fig. 7. The end edge member 11 of the aileron is also preferably formed in a suitable manner with a half round outer surface in cross section, thus giving a smooth rounded end edge and this member is preferably curved or stream-lined fore and aft to further reduce head resistance.

A tubular member 12 extends from end to end of the aileron between the ribs of the several pairs of ribs and forms the forward intermediate bar of the structure and also a fixed bearing for the aileron. This tube is preferably secured to the several ribs by means of clips 13, shown in detail in Fig. 12, which clips are U-shaped in cross section to embrace the ribs to which they are secured by suitable bolts or rivets, and each clip is preferably brazed or electrically welded to the tube so that the skeleton or frame of the aileron is rigidly attached and is supported by this tubular member. This tubular bearing for the aileron is preferably so positioned that the axis of support of the aileron will be slightly forward of its center of gravity.

Projecting outwardly from each end edge A' of the wing structure A is a portion 14 having a cross sectional contour corresponding to that of the adjacent aileron and affording an end edge extending in a plane parallel to the fore and aft axis of the aeroplane adjacent to which edge or side, the inner end of the aileron is supported in substantially abutting relation, said inner end of the aileron being formed to extend in a corresponding parallel vertical plane so that the aileron in its pivotal movement may turn freely, the portion 14 filling the space between the right angle end of the aileron and the inwardly inclined end of the wing and having a cross-sectional contour approximating that of the aileron.

To form a pivotal support for each aileron, a tubular shaft or spar 15 is fixed within each wing end and projects therefrom into the bearing tube 12 of the adjacent aileron, as shown in Fig. 6. The free end of this shaft 15 engages a bearing of suitable construction indicated at 16 in Fig. 6, within the tube 12, and a further bearing support for the tube upon the spar is provided adjacent the inner end of the aileron, as hereinafter more fully described.

The swinging member D having the weight E at its lower end and carrying the aerofoils C and F at its upper end, includes a split ring member 17 surrounding the tube 12 adjacent the inner end of the aileron, this ring being of greater internal diameter than the external diameter of the tube 12 to provide a space between the tube and ring, the two halves of which ring are secured together by means of bolts 18. The ring is supported independently of the tube 12 upon the spar 15 by means of a transverse shaft 19 passing through slots 20 and 21 in the spar and tube respectively, and having a bearing block 22 secured upon the shaft and provided with trunnions 23, the longitudinal axis of which trunnions corresponds with the longitudinal axis of the spar. These trunnions engage bearing blocks 24 secured within the spar 15 at each side of the slots 20 and the outwardly projecting ends of the shaft 19 engage ball bearings 25 seated in suitable seats therefor formed in the split ring 17. The block 22 is secured to its shaft in any suitable manner as by a pin 26 and the bearing blocks 24 are likewise rigidly secured in the spar in any suitable manner.

The tube 12 is connected to the split ring 17 to be supported thereby and which split ring is in turn supported by the spar 15 through the medium of the shaft 19, by means of studs 27 having curved base portions electrically welded or otherwise firmly secured to the outer surface of the tube 12, and these studs engage recesses 28 (see Fig. 2) formed in the ends of the laterally projecting portions 29 of the split ring, the portion 29 at the forward side of the ring projecting laterally therefrom in one direction and the portion at the aft side of the ring projecting laterally in an opposite direction. Plates 30 are secured over the recesses so as to be engaged by the outer ends of the lugs 27 to hold the tube 12 and aileron parts carried thereby, against lateral movement within the split ring 17, and thus support the bearing tube 12 concentrically of the spar 15.

Figure 17:
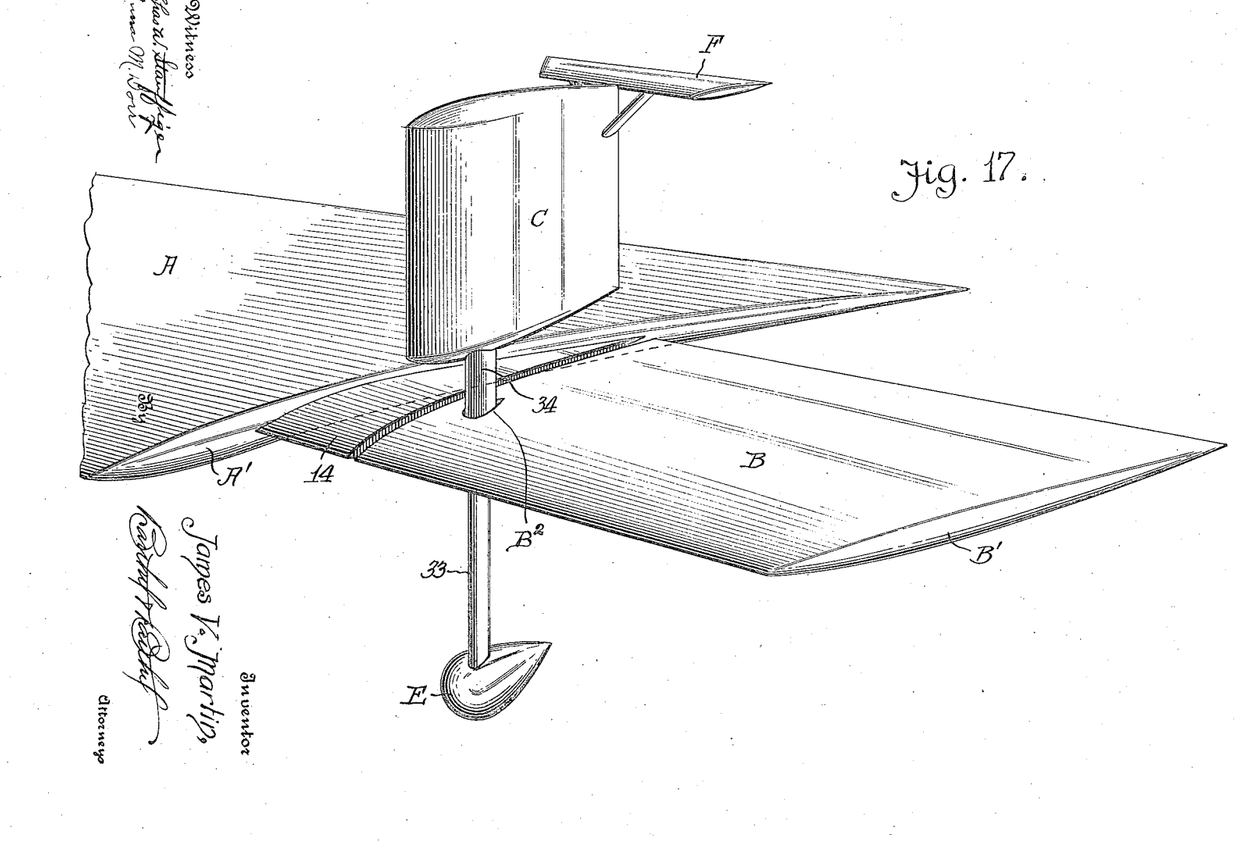
Fig. 17 a perspective view of a wing end and the attached aileron with its control gravity member and aerofoil.

Formed integral with the split ring 17 and projecting upwardly and downwardly therefrom are studs 31 and 32, the stud 31 being provided for the attachment of a tube 33 carrying the weight E at its lower end, the tube being slipped over the stud and brazed or otherwise secured thereto to attach it firmly to the split ring. The upwardly extending stud 32 projects into a sleeve 34 which is preferably of right angular form in cross section and a filler block 35 fills the space between the stud 32 which is of cylindrical form, and the sleeve, said sleeve and its filler block being free to turn upon the stud and are held thereon against longitudinal disengagement by a pin or screw 36 passing through the sleeve and engaging a groove in the stud. Above the upper skin of the aileron through an opening B² (see Fig. 17) in which the sleeve 34 extends and has a free tilting movement laterally and fore and aft, said sleeve may be given a stream line contour in cross section as indicated in dotted lines in Fig. 1, if it be found desirable so to do, this sleeve 34 being extended upwardly for some distance above the aileron to form a support for the vertical aerofoil C which is preferably rigidly attached thereto. The distance between the upper skin of the aileron and the lower edge of the aerofoil C is preferably such as to reduce interference and interference and head resistance are further reduced by stream lining the upper and lower ends of the aerofoil C fore and aft, and rounding these end edges transversely. The vertical aerofoil C is thus supported to rotate upon a vertical axis or about the longitudinal axis of its supporting staff 34, and to normally hold this aerofoil against turning upon this axis and with its plane of symmetry parallel to the vertical plane of the fore and aft axis of the aeroplane, an arm 37 is rigidly secured in any suitable manner to the lower end of the staff 34 and extends forwardly and downwardly therefrom, its free end being provided with a head 38 pivotally secured thereon to turn about the vertical axis of the reduced end portion 39 of the arm, said head being located in the horizontal plane of the longitudinal axis of the shaft 19.

Suitably curved guide plates 40 are carried by a shifting bar 41 to engage curved lateral end faces of the block or head 38 and prevent the lateral turning of the arm while permitting a free up and down movement of the arm, the block sliding between the guide plates 40. The curving or rounding of the ends of the block which engage the guide plates also permits the arm to swing laterally with the tilting movement of the ring 17 about the axis of the shaft 19. The bar 41 is mounted in suitable guide bearings 42 on the ribs of the aileron to have a free longitudinal movement and extends through a curved slot 43 in the adjacent rib 44 of the wing. The end of the shifting bar which projects into the wing is provided with a vertically extending U-shaped guide 45 to receive the end or head 46 of a push rod 47 mounted within the wing and extending therethrough to a point adjacent the pilot's seat so that he may manually move the rod endwise and thus swing the aerofoil C about its vertical axis of support. The rod 47 for operating the aerofoil at one end of the wing may be connected to the rod for operating the aerofoil at the other end of the wing so that both aerofoils will be operated simultaneously, or a separate push rod may be provided for operating each aerofoil independently of the other, as desired.

The split ring 17 which carries the downwardly extending tube 33 having the weight E on its lower end and the upwardly extending staff 34 carrying the aerofoils C and F on its upper end, is thus free to turn about the longitudinal axis of the spar 15 upon the trunnions 23 of the shaft 19, thus permitting of a free swinging movement of the weight relative to the aeroplane in a fore and aft direction, and the ring is also free to turn about the longitudinal axis of the shaft 19 when the weighted arm swings relative to the aeroplane parallel to the vertical plane of the transverse axis of the aeroplane.

Figure 1:
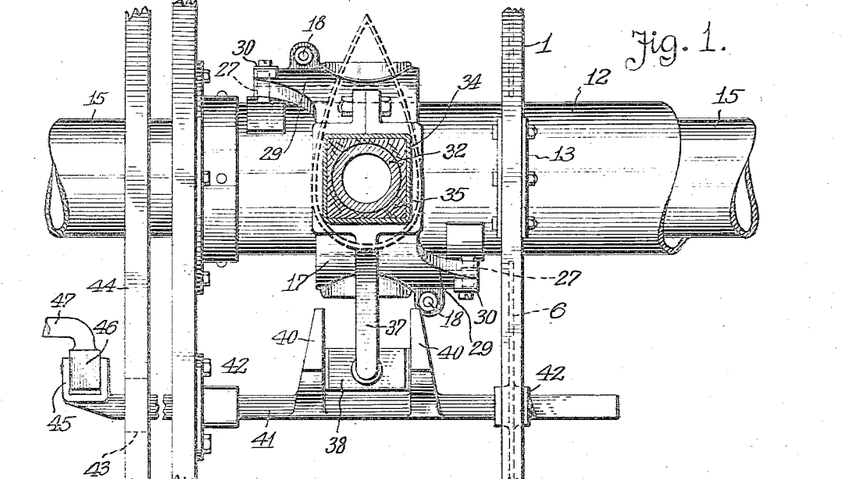
Figure 1 is a detail view of the mechanism for operatively connecting an aileron and its automatic controlling devices to impart rotation to the aileron upon fore and aft or lateral relative swinging movement of said devices and aircraft, and also illustrating a manually operable connection therewith.
Figures 2, 3:
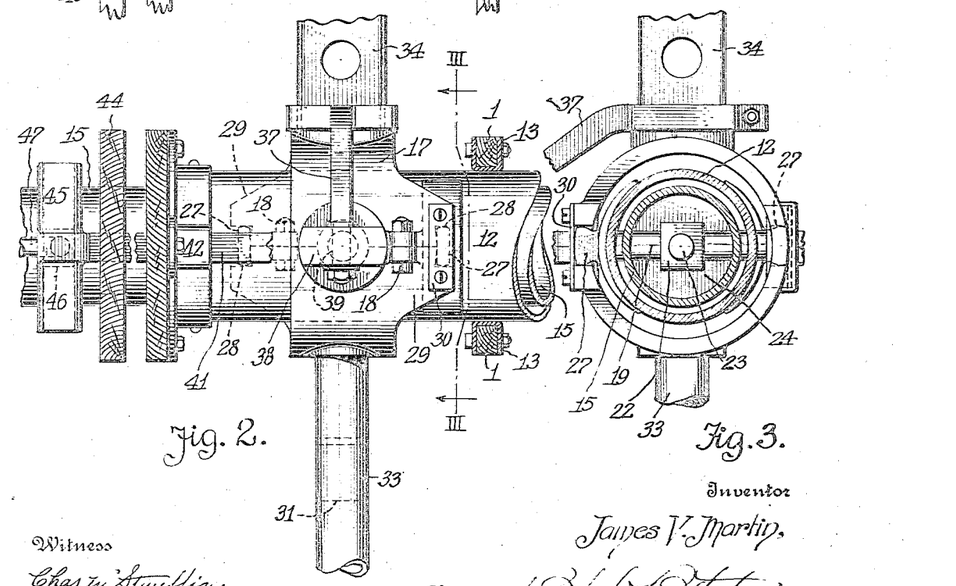
Fig. 2 is a side elevation of the same with portions broken away and in section.
Fig. 3 is a transverse section upon the line III—III of Fig. 2.
Figure 4:
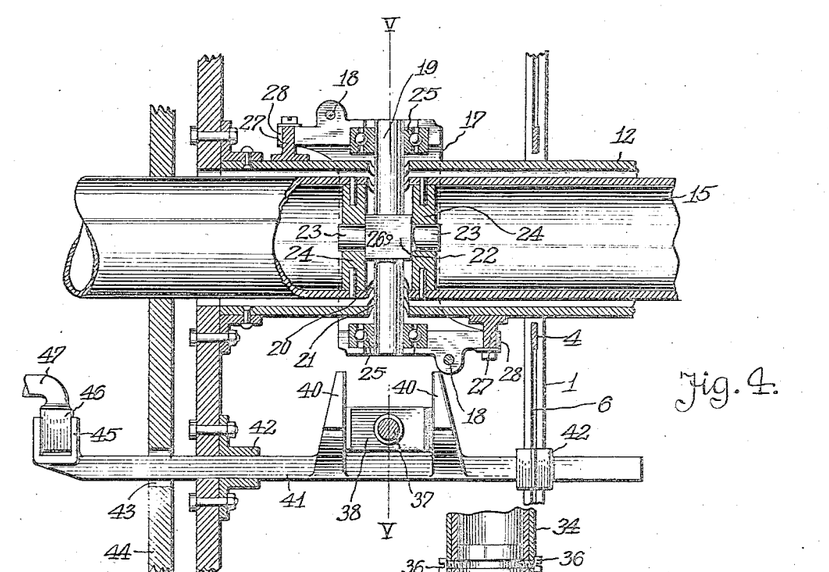
Fig. 4 is a view similar to Fig. 1 showing the mechanism in horizontal section.
Figure 5:
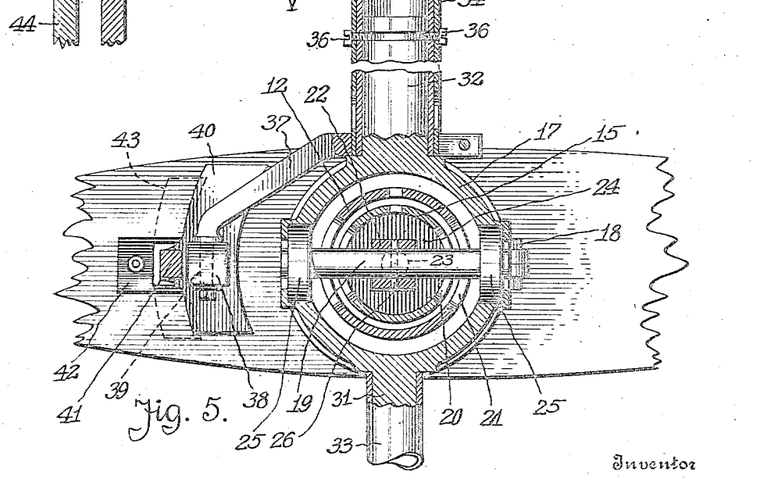
Fig. 5 is a transverse section upon the line V—V of Fig. 4.

When the gravity member by reason of the incidence of aerofoil F, is swung in a fore and aft direction, the tube 12 and consequently the aileron secured thereto is caused to rotate by reason of the engagement of the lugs 27 with said ring, these lugs being rounded or cut away at their sides which engage the sides of the recesses 28 in the ring, to permit free movement, as shown in Fig. 3, and when the weighted arm 33 swings transversely relative to the aeroplane, the ring is free to tilt upon its supporting shaft 19 and by reason of the engagement of the lugs 27 with the ring at opposite sides thereof, the tube 12 and its aileron will be rotated by a downward force exerted by the ring upon one of the lugs and an upward force exerted by the ring upon the lug on the opposite side of the tube. The surfaces of the notches or recesses 28 which engage the sides of the lugs are curved as indicated in Fig. 2 to permit this free tilting movement of the ring.

The split ring 17 and the manner in which it is operatively connected to the aileron to turn the same, provides a very simple and compact connection which may be located wholly within the skin of the aileron, thus further reducing the head resistance and simplifying the construction.

When the air craft is tilted or thrown out of equilibrium in flight, the member D with its split ring is held by the weight E in a perpendicular position and the relative lateral tilting of the aeroplane which lowers one wing and elevates the other, imparts a negative incidence to one aileron and a positive incidence to the other by reason of the connection of the split rings with the ailerons, thereby re-establishing the equilibrium of the aeroplane. Likewise, a change in the incidence of the wings rotates the spars 15 upon which the ailerons are mounted, relative to the ailerons, the position of which relative to the horizontal, is controlled by their connection with the gravity member D, and the horizontal fins F, being contacted by the air in flight, will tilt the gravity members fore or aft against the action of the weights E which tend to hold them in perpendicular position, and thus, through the connection of their split rings 17 with the ailerons, turn said ailerons and neutralize them to the line of flight.

Oblique airs local to a wing extremity which would tend to depress that wing, will act upon the vertical aerofoil C laterally and thus at once swing the weighted member including its split ring laterally, which swinging movement immediately imparts a slight rotation to the aileron, giving it the proper incidence to overcome the effect of the air current upon the wing extremity before the aeroplane is tilted thereby. The device therefore functions to automatically maintain the equilibrium and direction of flight of the aeroplane at all times and prevent side slipping or skidding, as a consequence of the incidence of aerofoils C and F created by the variations in direction and velocity of air currents local to the aeroplane wing extremities.

Under certain circumstances it may be very desirable to have the aeroplane control so arranged that the pilot may permit his machine to side slip or skid, this being particularly true of a fighting aeroplane which must be operated under conditions requiring quick and expert maneuvering.

In order to manipulate the automatic mechanism to permit side slipping or skidding which would under the control of the automatic mechanism alone, be prevented, the aerofoil C is mounted to turn upon a vertical axis or about the axis of its support upon the gravity device; and this pivotal movement is manually controlled through the arm 27, push bar 41 and rod 47. The pilot may therefore turn either or both of the aerofoils C out of parallelism with the line of progression, thus creating an air pressure upon one side of the aerofoil thus manipulated, which will tilt it laterally, swinging the gravity mechanism laterally and imparting an incidence to the aileron which will tilt the aeroplane laterally. This will permit the aeroplane to side slip and the amount of side slip will be accurately determined by the angle to which the aerofoil C is turned. The shifting of the vertical aerofoils C and the holding of them at an angle to the line of progression will cause the aeroplane to side slip just so long as these aerofoils are so held and the automatic operation of the controlling mechanism of the aileron will automatically control the amount of side slip so that it will have only the amount desired as determined by the pilot in setting the aerofoils.

Figure 18:
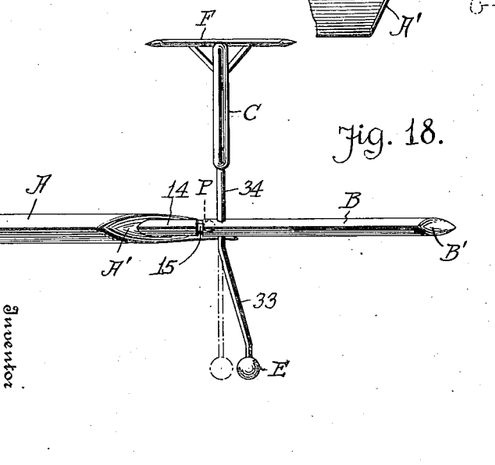
Figs. 18, 19 and 20 are front, end and plan views respectively of a wing end with attached aileron and controlling gravity member and aerofoil, illustrating a slight modification of the gravity member.
Figure 19:
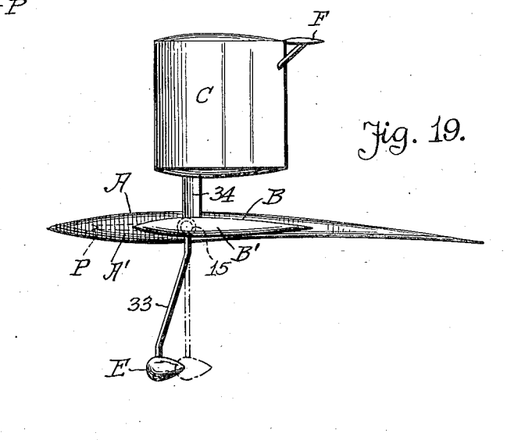
Figure 20:
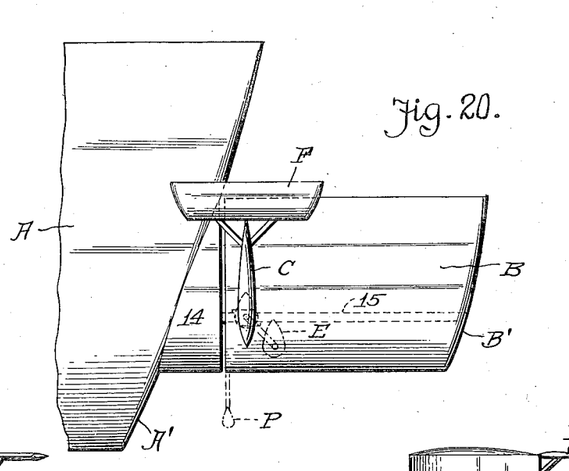

Obviously if the ailerons are balances, that is, if they are so pivoted that their center of gravity and axis of support substantially coincide, they may be easily turned and therefore will respond more readily to their automatic controlling mechanism. In order to bring this center of gravity of each aileron at such a point that it will substantially coincide with the axis of its support, as shown in Figs. 18, 19 and 20, the rod 33 carrying the counterweight E for the aileron, may be offset both forwardly and laterally, or this balancing of the aileron may be accomplished by weighting its leading edge or providing the forwardly extending arm thereon having a weight at its outer end, as indicated in dotted lines at P in Fig. 20.

What I claim is:—

1. In an aeroplane the combination with automatic stabilizing means located at each wing extremity and including a vertically disposed aerofoil, and manually operable means to modify the action of said vertical aerofoils, whereby said aerofoils will operate said automatic stabilizing means to tilt the aeroplane.

2. In an aeroplane, the combination of manually operable means for tilting the aeroplane about its fore and aft axis, aerofoils and means at the wing extremities for automatically operating said aerofoils to maintain the aeroplane in the position to which it is tilted by said manually operable means.

3. In an aeroplane, the combination of manually adjustable means for causing a tilting movement of the aeroplane, about its fore and aft axis, including aerofoils and means at the wing extremities for automatically operating said aerofoils to limit such tilting movement to the degree of inclination caused by the adjustment of said manually operable means, said automatic means being free to operate independently of and coincidentally with said manually operable means.

4. In an aeroplane, the combination with automatic stabilizing means adjacent each wing extremity including aerofoils, of manually operable means for modifying the operation of said automatic means at each wing extremity to effect side slip of the aeroplane while under the control of said automatic means.

5. In an aeroplane, the combination with automatic stabilizing means including a swinging gravity member and an aerofoil operated thereby, of manually operable means for effecting a movement of said member to change the position of said aerofoil and modify the operation of said stabilizing means while the aeroplane is under the control thereof.

6. In an aeroplane, the combination with automatic stabilizing means including an aerofoil, of manually operable means for setting and holding said aerofoil at an angle to the line of flight, said means being arranged to automatically control said aerofoil while the same is held by said manually operable means.

7. In an aeroplane, the combination with automatic stabilizing means including a vertically disposed aerofoil, of manually operable means for effecting a lateral inclination of said aerofoil to effect a change in the lateral balance of the aeroplane while controlled automatically and coincidentally with said automatic control.

8. In an aeroplane, the combination with automatic stabilizing means including an aerofoil, a gravity member for operating said aerofoil, of manually operable means for effecting a movement of said member to modify the operation of said aerofoil, said gravity member being free to move in fore and aft and transverse planes to effect an operation of said aerofoil while said manually operable means is effective for holding said gravity member in the position to which it has been adjusted by said manual operation.

9. In an aeroplane, the combination with automatic stabilizing means including a gravity member free to swing in fore and aft and transverse planes, of manually operable means for effecting a swinging movement of said gravity member in its transverse plane and holding the same in adjusted position while operating to automatically control said stabilizing means.

10. In an aeroplane, the combination of automatic stabilizing means including an aileron and a gravity member adapted to swing in fore and aft and transverse planes, and manually operable means operatively connected thereto to modify the operation of said stabilizing means, said gravity member being free at all times to swing in transverse planes, and means for imparting motion to said aileron from said member upon swinging movement thereof in either of its planes of movement, including a member adapted to rotate about and tilt relative to the axis of support of said aileron.

11. In an aeroplane, the combination with an aileron, of automatic means for changing the incidence of said aileron comprising a gravity member and means for transmitting movement to the aileron from said gravity member, said means being carried by the pivotal support for the aileron and positioned wholly within and enclosed by the skin of the aileron.

12. In an aeroplane, an aileron comprising an entering edge bar having a projecting tongue, a trailing edge bar having a projecting edge tongue, ribs secured at their ends to said tongues and an intermediate pivotal support for the aileron.

13. In an aeroplane, an aileron, comprising an entering edge bar, a trailing edge bar, a series of ribs arranged in pairs and secured at their ends to said bars, and a tubular member forming a bearing for the aileron and extending transversely of the ribs between the members of each pair, each pair of ribs being secured thereto.

14. In an aeroplane, an aileron comprising an entering edge bar, a trailing edge bar, a series of ribs arranged in pairs and secured at their ends to said bars, a tubular member extending transversely of the ribs between the ribs of each pair and an edge member stream lined in the direction of its length and having a transversely rounded edge surface forming the end edge surface of the aileron.

15. In an aeroplane, a main sustaining plane having end edges which converge forwardly at an angle to the fore and aft axis of the aeroplane, an aileron at each end of the main plane, said ailerons having outer end edges converging forwardly, means for pivotally supporting the ailerons, and control aerofoils having end edges converging forwardly at an angle to the fore and aft axis of the aeroplane.

16. In an aeroplane, an aileron having an entering edge bar, a trailing edge bar, pairs of ribs connecting said bars, a tubular member extending transversely of the ribs between the pairs thereof and clips embracing the ribs and secured to the tubular member.

17. In an aeroplane, an aileron comprising an entering edge bar, a trailing edge bar, a series of pairs of ribs secured at their ends to said bars, the ribs of each pair being grooved longitudinally at their adjacent sides, and struts and bracing members spacing the ribs of each pair and engaging said grooves.

18. In an aeroplane, an aileron comprising an entering edge bar having a rearwardly projecting tongue, a trailing edge bar having a forwardly projecting tongue, a series of pairs of ribs secured at their ends to the tongues of said bars, a tubular member extending longitudinally of the aileron transversely of and between the ribs of each pair, an end edge rib secured to the outer ends of said bars and formed convexo-concave in cross-section and stream lined longitudinally, and supporting means extending into the tubular member for pivotally supporting the aileron.

19. In an aeroplane, the combination of a main sustaining plane having end edges converging forwardly, a stream lined aileron at each end of the main plane, said ailerons having inner ends extending parallel with said fore and aft axis, said two outer ends of said ailerons converging forwardly, and extension portions formed integral with the end edges of the main plane and having a contour corresponding to the exterior of the ailerons with outer end edges adjacent the inner ends of the ailerons, and means for pivotally supporting the ailerons in alignment with said extensions.

20. In an aeroplane, the combination of an aileron, a pivotal support for the aileron, an annular member surrounding said support and free to turn and tilt relative thereto and having operative connection with said aileron to turn the same upon rotative or tilting movement of said annular member, and a gravity member carried by said annular member.

21. In an aeroplane, the combination of an aileron, a tubular member in the aileron, a fixed supporting member extending into the tubular member, an annular member surrounding the tubular member and supported by the fixed member to have rotative and tilting movement thereon, means connecting said annular member and said tubular member for imparting motion to the tubular member, and a gravity member on said annular member.

22. In an aeroplane, the combination of an aileron, a fixed pivotal support for the aileron, an annular member surrounding the support, means for supporting the annular member upon the fixed support to permit a free rotation of the annular member upon an axis coincident with the axis of the supporting member, said annular member being free to turn upon said means about an axis transverse to the axis of the supporting member, and means carried by the annular member for turning the same upon both axes of support, said annular member having an operative connection with the aileron to turn the same.

23. In an aeroplane, the combination of an aileron, a tubular member, a fixed supporting member extending into the tubular member, an annular member surrounding the tubular member and spaced therefrom, means mounted upon the fixed supporting member to turn upon the longitudinal axis thereof, said means forming a pivotal support for the annular member upon which said annular member is free to turn about an axis transverse to the axis of the fixed supporting member, means forming an operative connection between said tubular member and said annular member, and means on the annular member for operating the same.

24. In an aeroplane, the combination of an aileron, a tubular bearing member on the aileron having slots in the sides thereof, a fixed supporting member extending into the tubular member, a pivot member carried by the fixed member to turn about the longitudinal axis thereof and extending through the slots in said tubular member, an annular member pivotally supported upon the outer ends of said pivot member and having a projection at one side thereof extending longitudinally of the tubular member in one direction and a projection at the opposite side extending longitudinally of the tubular member in an opposite direction, lugs on the tubular members to engage the projecting portions of the annular member and means carried by the annular member for tilting and rotating the same relative to the longitudinal axis of the fixed supporting member.

25. In an aeroplane, the combination of an aileron, a tubular member forming a pivotal support therefor, a fixed bearing member extending into the tubular member, an annular member surrounding the tubular member and supported by the fixed member to have a rotative and tilting movement thereon, means forming an operative connection between the annular member and the tubular member, a gravity member carried by the annular member and a vertically disposed aerofoil carried by the annular member.

26. In an aeroplane, the combination with a pivotally supported aileron, of gravity means operatively connected to the aileron to turn the same, said gravity means including a downwardly extending weighted member which is offset, whereby the center of gravity of the aileron is made to substantially coincide with the axis of the pivotal support of the aileron.

27. In an aeroplane, the combination with a pivotally supported aileron, of a gravity member operatively connected to the aileron to turn the same and comprising a downwardly extending rod having a weight at its lower end, said rod being offset forwardly intermediate its ends.

28. In an aeroplane, the combination with a pivotally supported aileron, of a gravity member adapted to swing in fore and aft and lateral directions and having operative connection with the aileron to turn the same upon the fore and aft and lateral swinging movements of said gravity member, a vertical aerofoil carried by the gravity member above the horizontal plane of the aileron and a weight on the lower end of the gravity member, said gravity member being offset between the aileron and weight.

29. A wing, motor, and body aeroplane combination wherein the pilot's cockpit is located in the upper portion of the said body, to rearward of the aeroplane motor and in a recess cut in the leading edge of the said wing.

30. In combination with an aeroplane wing a rigid extension of the said wing of shorter chord length and arranged beyond the lateral extremity thereof and an aileron operatively attached to the said extension and adapted to swing about an axis transverse to the line of flight.

31. In combination with an aeroplane wing an aileron arranged to swing upon an axis transverse to the line of flight and the said aileron supported by attachment to a short chord rigid extension of the said wing and said aileron axis located forward of the fore and aft centre of the said wing.

32. In combination with an aeroplane wing, a rigid extension of said wing arranged at the lateral extremity thereof, said extension being of shorter chord than the said wing, and provided with an operative attachment for an aileron, said attachment being forward of the fore and aft center of the aeroplane wing.

33. In combination with an aeroplane fuselage, a pilot's position forward of the aeroplane wing and adapted to keep the pilot's eyes normally in the substantial plane of the said wing, and to rearward and above the propeller, radiator and the motor compartment of the said fuselage.

34. In combination with an aeroplane fuselage having a power propelling unit in its forward portion, a pilot's position immediately to rearward of said propelling unit, adapted to keep the pilot's eyes normally in the substantial plane of the wing and accessible to the said propelling unit and means to see from said pilot's position above and below the said wing.

35. An aeroplane pilot's position forward of and below the adjacent aeroplane wing, and to rearward and above the radiator, and a housing extending from the sides of the said radiator to inclose the said pilot's position.

36. In combination with an aeroplane, a motor and propeller hub therefor and a pilot's cockpit arranged forward of an aeroplane wing and to rearward and above the said motor and propeller hub.

37. In combination with a tractor biplane a fuselage therefor inclosing a motor compartment in its forward part and provided with an attachment for both upper and lower of said biplane wings, and the said upper wing being continuous where it extends over the top of the said fuselage, said upper wing being in the plane of the pilot's eye.

38. The combination in an aeroplane of an upper and lower wing and a fuselage to which both said upper and lower wings are immediately attached, said upper wing being continuous over the top of the said fuselage and in the plane of the pilot's eye.

39. An aeroplane wing and body combination wherein the wing is continuous across the top of the aeroplane body, said body provided with a motor in its forward part and a pilot's position between the said wing and the said motor.

40. The combination in an aeroplane of a fuselage having a wing attached to its upper portion and said wing and fuselage providing a pilot's position in the combined forward portion of said wing and the forward upper portion of the said fuselage, and an aeroplane radiator arranged to close the forward end of the said fuselage.

41. In combination with an aeroplane a fuselage therefor provided in its forward part with a propeller, a radiator and a driving unit, a wing attached to the upper portion of the said fuselage and said fuselage further provided with two openings in its upper cover, one of said openings being forward of the said wing attachments and one aft thereof, and both of said openings being adapted for the protrusion of a person's head.

In testimony whereof I affix my signature in the presence of two witnesses.

JAMES V. MARTIN.

Witnesses:
ADOLPH C. GUBNER,
JOSEPHINE SNYDER.